UNITED STATES PATENT OFFICE.

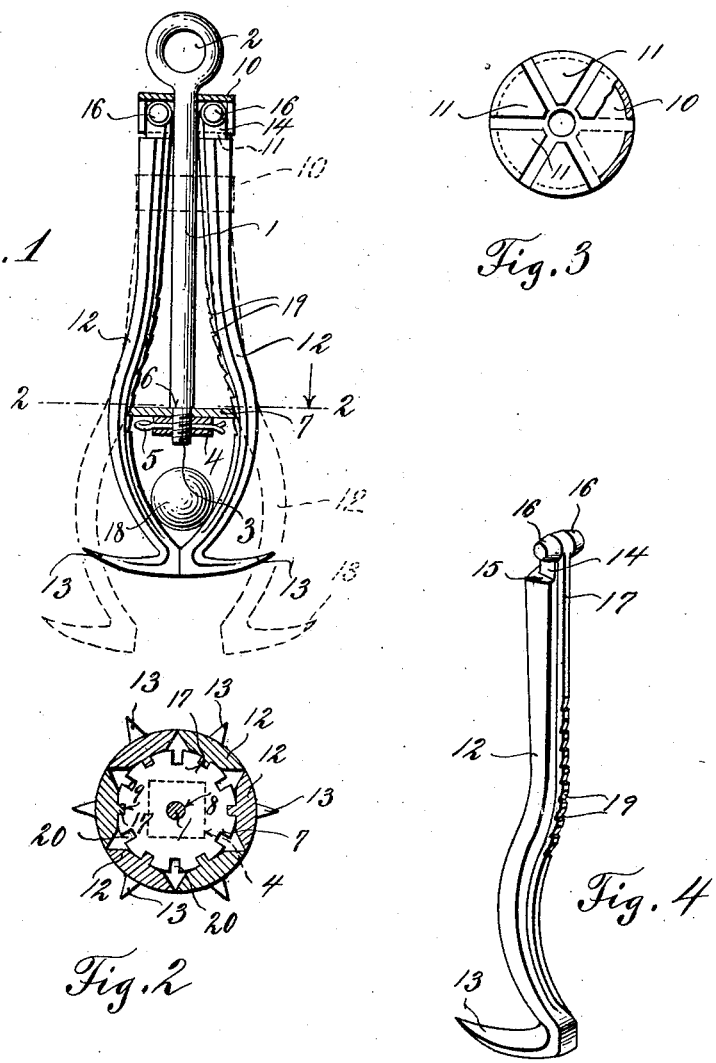

EDWARD CONIA, OF MEETEETSE, WYOMING.

ANIMAL-TRAP.

1,003,342.  Specification of Letters Patent.  Patented Sept. 12, 1911.

Application filed December 30, 1910. Serial No. 600,119.

*To all whom it may concern:*

Be it known that I, EDWARD CONIA, a citizen of the Republic of France, residing at Meeteetse, in the county of Park and State of Wyoming, have invented certain new and useful Improvements in Animal-Traps, of which the following is a specification.

This invention is primarily designed to construct an animal trap which, in the animal's attempt to escape, will more securely entrap the victim.

This invention is constructed in a simple and durable manner and, owing to its efficiency, the same will supply a long felt need among hunters and trappers.

For a full understanding of the present invention, reference is to be had to the following description and to the accompanying drawings, in which—

Figure 1 is a vertical sectional view disclosing the construction of the present invention; Fig. 2 is a transverse section taken on line 2—2 of Fig. 1; Fig. 3 is a detail used in the construction of the trap; Fig. 4 is a view illustrating one of the hook or snag members.

Referring to the drawings, 1 indicates a rod or bolt provided with an eye 2 at its upper terminal and a reduced portion 3 at its lower terminal, said reduced portion being provided with screw threads adapted to receive a retaining nut 4. A hole pierces the nut 4 and reduced portion 3 in which is inserted a cotter pin to prevent the nut from accidental displacement. A shoulder 6 is provided at the junction of the reduced portion 3 and the main body of the bolt 1. A spreader or operating member 7 is provided with a central opening 8 through which the reduced portion 3 of the bolt 1 is adapted to pass after which the nut and cotter pin are secured in the manner above described. The spreader member is adapted to bear against the shoulder 6 on its upper side, and is prevented from vertical movement by the nut 4 which engages the former on its under side. The spreader or operating member 7 is provided with notches 9 on its peripheral surface for the purpose hereinafter described.

A collar or cap member 10 is slidably mounted upon the bolt 1 as illustrated, said cap member being the shape of an inverted cup, the lower edge thereof being provided with inwardly projecting flanges 11 which extend approximately to the bolt body as will be readily understood from the drawing. A plurality of hook or snag members 12 are pivotally secured to the cap or pivot member 10, said hook members comprising a main shank portion bent outwardly and then inwardly adjacent to the lower terminal as illustrated, and a pointed bill 13 secured to the lower terminal of said shank and projecting outwardly therefrom. The upper portion of said shank is reduced, as at 14, forming shoulders 15 which engage beneath the pivot member 10. The projection 14 is provided with trunnions 16 which are adapted to bear or operate in the spaces between the flanges 11 and the upper portion of the cap 10. A rib 17 is provided on the inner surface of each hook member and is adapted to slidably operate in the notches 9 of the spreader or operating member 7.

In securing the hook members to the cap or pivot member 10, the latter is removed from the bolt body, at which time it will readily be observed that the projection 14 carrying the trunnions 16 may be inserted in the space between the inner extremities of the flanges 11, and from thence is forced into the spaces between said flanges. After the hooks are placed in the pivot member, as just described, the bolt body 1 is inserted in the cap member after which the spreader member 7 and the nut 4 are secured to the reduced portion of said bolt body. When the trap is in its normal position, the spreader plate or member 7 is located between the hook members at their outwardly bent portion, the notches in said spreader member engaging the rib 17 of the hook member at all stages in the operation.

In operation, the trap is secured to a tree or similar support by the eye 2 provided in the bolt 1 and at such a distance from the ground that the animal will have to lift its fore feet off the ground in order to secure the bait which would be tied or otherwise secured to the pointed bills 13. It will be observed that a slight pull upon the bills 13 would draw the cap or pivot member 10 downwardly, and thus throw the hook members outwardly toward a horizontal plane owing to the spreader member 7 operating upon the shank portions of the hook members. It will further be observed that in the animal's attempt to free himself from the snag members, he will tend to throw the bills farther upwardly and thus beyond the doubt prevent his escape.

The ribs 17 are provided with notches 19 which are adapted to engage the spreader member and prevent the same from sliding downward and thus retain the hook members in their outward position. The pivot member may be formed in any desired manner, as from a hollow disk having coinciding central bores of different diameters and provided with a plurality of diametrical slots in its lower surface, as will readily be observed.

The spreader 7 is provided with a second set or series of notches 20 and of a different depth than the notches 9, either set of which may be used to accomplish the same result. A ball or strangling member 18 of lead or any other material is provided, as shown in Fig. 1, so that the same will drop into the animal's throat when the bills 13 have engaged the jaws of the animal, as will readily be observed.

Instead of forming the pivot member as above described, the same may be stamped from a flat piece of metal to a form resembling a star, the points thereof being bent to obtain the same structure, as illustrated in the drawings.

By having the hook members resting in contact at their lower terminals, there is no yielding tendency when the same are grabbed by the animal and since it is practically a rigid structure at the lower portion the snagging or piercing of the animal by the bills 13 is more effective than if the hook members presented a yielding tendency. By having the longitudinal edges of the hook members resting in contact, the spreader member and strangling ball are completely housed and are free from any obstructions which might enter within and render the trap inoperative.

Having thus fully described my invention, what is claimed as new is:—

1. A trap comprising a body member, hook members carried thereby, means for spreading said hook members, and a strangling member carried by said hook members adapted to be displaced when the latter are spread apart as set forth.

2. A trap comprising a body member, hook members carried thereon, means for spreading said hook members, and a ball adapted to drop into the throat of the animal when the hook members are spread apart, the lower terminals of the latter resting in contact with each other to form a seat for said ball, as set forth.

3. In a trap, the combination with a body member, of a spreader member carried thereby, a pivot member slidably mounted on said body member comprising a hollow disk having a central bore therein and provided with diametrical slots on its lower surface, a plurality of hook members having pivots extending across said slots and adapted to operate therein, said body member preventing displacement of said hook members from said slots, as set forth.

4. A trap comprising a body member, hook members carried thereon, means for spreading said hook members, and a strangling member carried by the latter, the longitudinal edges and the lower terminals of each hook member resting in contact with the corresponding parts of the adjacent hook members to form a housing for said means and strangling member for the purposes herein set forth.

5. A trap comprising a body member, hook members carried thereon, means for spreading said hook members, and means carried by the latter adapted to engage said spreading means and retain the hook members in a rigid position when spread apart, as set forth.

6. A trap comprising a body member, hook members carried thereon, and means for spreading said hook members, the latter being provided with notches adapted to be engaged by said means for retaining the hook members in a rigid position when the latter are spread apart, as set forth.

In testimony whereof I affix my signature in presence of two witnesses.

EDWARD CONIA.

Witnesses:
 WILLIAM O. STEELE,
 JAMES L. PRICE.

---

Copies of this patent may be obtained for five cents each, by addressing the "Commissioner of Patents, Washington, D. C."